United States Patent [19]

Turner

[11] 3,886,015

[45] May 27, 1975

[54] COMPOSITE THREAD AND PROCESS FOR MAKING THE SAME

[76] Inventor: Robert F. Turner, 190 Forrest Ln., Menlo Park, Calif. 94025

[22] Filed: Aug. 23, 1973

[21] Appl. No.: 390,720

[52] U.S. Cl. ............... 156/166; 156/201; 156/229; 161/175
[51] Int. Cl............................................. D04h 3/16
[58] Field of Search .......... 156/176, 180, 166, 229, 156/245, 54, 53, 438; 161/175

[56] References Cited
UNITED STATES PATENTS

| | | | |
|---|---|---|---|
| 2,468,165 | 4/1949 | Brister et al. | 156/54 X |
| 3,081,212 | 3/1963 | Taylor et al. | 156/229 X |
| 3,095,643 | 7/1963 | Cooke et al. | 156/54 X |
| 3,321,572 | 5/1967 | Garner | 156/54 X |
| 3,332,138 | 7/1967 | Garner | 156/54 UX |
| 3,371,477 | 3/1968 | Felix | 57/157 F |
| 3,535,177 | 1/1967 | Hinds et al. | 156/54 |
| 3,574,016 | 4/1971 | Wahlberg | 156/54 |
| 3,654,027 | 4/1972 | Middleton | 156/54 X |
| 3,681,515 | 8/1972 | Mildner | 156/54 X |
| 3,733,225 | 5/1973 | Moody | 156/54 X |

*Primary Examiner*—George F. Lesmes
*Assistant Examiner*—Alan T. McDonald
*Attorney, Agent, or Firm*—Robert Charles Hill

[57] ABSTRACT

A composite thread having a core composed of one or more filaments circumscribing which is a sheath of the same or different material. The composite thread has physical properties different from the physical properties of the individual components of which it is formed. The sheath is formed of a heat formable polymeric film which is stretched or elongated with respect to the core during manufacture of the composite thread. A process for manufacturing a composite thread wherein the sheath circumscribes the filament or filaments that constitute the core and wherein the materials are drawn through a die so as to establish the cross-sectional shape of the composite thread. As the elements are drawn through the die greater tension is applied to the sheath material so that it is elongated relative to the core filaments thereby to afford the desired physical properties.

4 Claims, No Drawings

COMPOSITE THREAD AND PROCESS FOR MAKING THE SAME

This invention relates to a composite thread and to a method for forming such thread to produce desired physical properties that are different from the physical properties of the individual elements of which the composite thread is formed.

Elongate threads, ropes, strands, etc., require various manufacturing steps for their formation. By way of example, U.S. Pat. No. 3,371,477 describes a process wherein a film of orientable synthetic linear polymeric material is subjected to fibrillation to enhance the flexibility and dynamo-metric characteristics of the threads made by such material. The present invention also affords enhancement of the properties of the composite thread by combining elongate elements of two different materials and by processing the materials into a single thread or strand that has desired physical properties which may be different from the physical properties of the individual elements. Among the physical properties that can be established at virtually any magnitude are break strength, elongation at break, and mean diameter.

The composite thread of the present invention includes a core and a sheath. The core is made of strands of synthetic polymers, fiberglass or metal strands such as spun aluminum. The core can be made up of a single strand, a plurality of strands of the same material, or a plurality of strands of differing material, the choice being dictated by the desired properties of the completed composite structure. The sheath is formed of one or more polymeric films, exemplary materials including polyester film, polypropylene film, nylon, saran, dacron, etc.

Before fabrication of the composite thread, the sheath is in the form of a tape. Prior to processing the length of the tape is less than the length of the core; the tape is heated and stretched so that its length corresponds to that of the core and the tape and core filaments are drawn through a die to establish the cross-sectional shape of the finished thread. After die forming the thread the temperature is reduced to ambient whereupon the tape contracts into intimate circumscription of the core. The tape can either totally circumscribe the strands of the core or can be arranged in a zig zag pattern in which various strands of the core reside within different folds of the tape.

The tape that forms the sheath of the composite thread of the present invention has a thickness which is dictated by the cross-sectional size of the composite thread and by the physical properties of the thread. Thicknesses in the range of about 0.0005 inches to about 2.00 inches are preferable. The width of the tape is dictated primarily by the number and cross-sectional dimension of the filaments that compose the core. Tape widths in the range of about 3/32 of an inch to 5 inches can be employed. Because the tape is stretched or elongated during manufacture of the composite thread, the beginning length of the tape is less than the length of the core.

The number, diameter, and composition of the core filaments is selected in accordance with the desired physical properties of the finished composite thread. The core filaments can be either monofilaments or multifilaments or a combination of both. Although the filaments are typically formed of polymeric material, they can be fiberglass or spun metal in applications where high strength and a small elongation at break is desired.

In practicing the process of the present invention the tape is raised to an elevated temperature in a range of about 50°C to about 400°C so that the tape can be stretched or elongated to within a range of about 5 to 120% of the elongation at break of the unheated material. Within the above stated temperature range, the tape is in a plastic or semi-fluid condition which enhances the ability of the tape to totally circumscribe the core filaments. The core filaments are typically heated to the same degree but they experience little or no elongation because they are drawn through an opening in a forming die at extremely slight tension.

A die useful in practicing the process of the present invention typically defines an opening that is either a simple or graduated circular, rectangular, triangular, or square shape. The die can also take the form of a spiral or converging tube having a cross-sectional shape corresponding to the desired shape of the composite article. In any event, in practicing the process the core filaments and tape are introduced into the die and tension is applied to the composite structure at the outlet end of the die. At the inlet end of the die the materials are heated and a breaking force or resistance force is applied to the tape only so that when the composite structure is drawn through the die the tape will be elongated with respect to the core filaments. The combination of the elevated temperature and the die opening assures an intimate interspersion of the core filament or filaments within the sheath. When the composite thread is cooled a stable structure is produced. Depending on the selection of the core and sheath materials the composite structure can have a tensile strength less than, equal to, or greater than the combined tensile strengths of the individual components. Moreover, the composite structure can be fabricated to exhibit elongation characteristics wherein the elongation at break of the composite structure is equal to or less than the elongation at break of the component parts when considered separately.

One example of a composite thread formed according to the process of the invention includes employment of a strip of polyester film having a width of three quarters inches and a thickness of 0.001 inch. A core composed of a 1,000 filament polyester multifilament wherein each of the individual filaments is 1,500 denier was provided. Both members were passed through a heated chamber at the outlet end of which was disposed a forming die. As the two components were pulled through the die, the film strip was subjected to stress or tension and the core was not subjected to significant tension. After drawing through the die and cooling, the results and composite thread was found to have an elongation factor of 12% at break and a tensile strength in excess of forty pounds. The following table compares the physical properties of the composite thread with the physical properties of the individual components thereof:

|  | Prestretched Polyester Film | Polyester Monofilament | Combination Prod. After Processing Described Above |
|---|---|---|---|
| Break strength (lbs.) | 25 | 15 | 40 |
| Elongation at Break (%) | 9.2 | 15 | 12 |
| Mean Diameter (mils) | .026 | .018 | .03 |
| Break Strength (lbs.) | 25 | 60 | 85 |
| Elongation at Break (%) | 9.2 | 4 | 6.87 |
| Mean Diameter (mils) | .026 | .018 | .03 |

Thus it will be seen that the present invention provides a composite thread and a method for forming the same which affords achievement of virtually any physical properties by proper selection of the core material and the sheath material. Because the process of the invention requires elongation of the sheath in a longitudinal direction and operates so that the sheath circumscribes the core in parallelism with the core the process lends itself to high speed production capabilities. This should be contrasted with certain proposals for wrapping a core with a helically wound tape sheath. As the above example makes clear, the composite thread has physical properties different from and substantially superior to the physical properties of the individual components. Thus a synergistic result is afforded by the present invention.

Although one embodiment of the invention has been described in detail, it will be obvious that other adaptations and modifications can be made without departing from the true spirit and scope of the invention.

What is claimed is:

1. A process for manufacturing an elongate thread having physical properties different from and substantially superior to the physical properties of the individual components comprising the steps of providing a core having at least one filament, providing a tape of polymeric film having a width greater than the circumference of the filament and a length less than the length of the filament, heating the tape, applying tension to the tape to stretch the tape to a length approximating that of the filament, placing the tape in circumscribing relation to the filament while continuing the tension applying step to form a composite member and to provide an intimate interspersion of the filament within the sheath, and cooling the composite member, whereby said elongate thread has a break strength at least approximately equal to the break strength of said core and tape combined.

2. A process according to claim 1 wherein said placing step includes the steps of providing a die having an opening corresponding to the shape of the elongate thread, and drawing the composite member through the die opening.

3. A process for manufacturing an elongate thread having physical properties different from and substantially superior to the physical properties of the individual components comprising the steps of providing a core having at least one filament, providing a tape of polymeric film having a width greater than the circumference of the filament, providing a die having an opening corresponding to the desired cross-sectional shape of the thread, introducing the tape and the core into the die opening with the tape in circumscribing relation to the core and to provide an intimate interspersion of the filament within the sheath heating at least the tape, drawing the tape and core through the die opening to form a composite member, said drawing step being performed so as to tension the tape sufficient to elongate the tape relative to the core, and cooling the composite member after performance of the drawing step, whereby said elongate thread has a break strength at least approximately equal to the break strength of said core and tape combined.

4. An elongate thread formed according to the process of claim 3.

* * * * *